(12) United States Patent
Jin et al.

(10) Patent No.: US 10,521,473 B2
(45) Date of Patent: Dec. 31, 2019

(54) SHORTEST PATH COMPUTATION IN LARGE NETWORKS

(71) Applicant: Kent State University, Kent, OH (US)

(72) Inventors: Ruoming Jin, Streetsboro, OH (US); Ning Ruan, Santa Clara, CA (US)

(73) Assignee: KENT STATE UNIVERSITY, Kent, OH (US)

( * ) Notice: Subject to any disclaimer, the term of this patent is extended or adjusted under 35 U.S.C. 154(b) by 148 days.

(21) Appl. No.: 13/899,124

(22) Filed: May 21, 2013

(65) Prior Publication Data

US 2013/0339352 A1 Dec. 19, 2013

Related U.S. Application Data

(60) Provisional application No. 61/649,612, filed on May 21, 2012.

(51) Int. Cl.
G06F 16/901 (2019.01)

(52) U.S. Cl.
CPC ................... *G06F 16/9024* (2019.01)

(58) Field of Classification Search
USPC ........................................................ 707/736
See application file for complete search history.

(56) References Cited

U.S. PATENT DOCUMENTS

| | | | |
|---|---|---|---|
| 7,765,319 B1* | 7/2010 | Gorman | H04L 41/12 370/351 |
| 2009/0204554 A1* | 8/2009 | Koren | G06F 17/30958 706/12 |
| 2009/0296719 A1* | 12/2009 | Maier | H04L 45/12 370/400 |
| 2011/0302291 A1* | 12/2011 | Draugelis | 709/224 |
| 2012/0250535 A1* | 10/2012 | Delling et al. | 370/252 |
| 2012/0269200 A1* | 10/2012 | Aggarwal | H04L 47/00 370/410 |

* cited by examiner

*Primary Examiner* — Muluemebet Gurmu
(74) *Attorney, Agent, or Firm* — Renner Kenner Greive Bobak Taylor and Weber; Tim Hodgkiss; Ray Weber

(57) ABSTRACT

Embodiments disclosed herein provide systems, methods, and software for determining the shortest distance between vertices in relatively large graphs. In an embodiment a method includes identifying an original graph comprising a plurality of nodes and a plurality of edges, identifying a plurality of hub nodes from within the original graph, creating a hub matrix comprising the plurality of hub nodes and the shortest distance between the plurality of hub nodes, and determining a shortest distance between the at least two nodes using the original graph and/or the hub matrix.

10 Claims, 7 Drawing Sheets

L(0)={4:2, 12:2, 17:2, 19:3}  L(14)={12:1}
L(1)={4:1, 6:2, 12:2, 19:3}  L(15)={12:1, 17:1, 19:2}
L(2)={12:1, 17:1}  L(16)={17:1, 18:1}
L(3)={6:1, 12:1}  L(20)={19:1, 12:2, 17:2}
L(5)={4:1, 8:1, 18:1}  L(21)={17:1, 19:1, 4:3}
L(7)={4:1, 6:1, 18:2}  L(22)={12:2, 19:2, 17:3}
L(9)={8:1}  L(23)={19:1, 17:2, 4:3}
L(10)={4:1, 8:1, 19:1, 18:3}  L(24)={19:2, 8:3, 12:3, 17:3}
L(11)={8:1, 4:2, 18:2, 17:3}  L(25)={18:1, 4:2, 8:2}
L(13)={12:1, 17:1, 19:1}  L(26)={12:1, 18:1}

SHORTEST PATH COMPUTATION IN LARGE NETWORKS

RELATED APPLICATIONS

This application hereby claims the benefit of, and priority to, U.S. Provisional Patent Application 61/649,612, titled "SHORTEST PATH SEARCH IN MASSIVE SOCIAL NETWORK", filed May 21, 2012, and which is hereby incorporated by reference in its entirety for all purposes.

TECHNICAL BACKGROUND

A relational database system is a collection of data items organized as a set of formally described tables from which data can be accessed. These relational databases can become very large, and the response to any query of these databases may require accessing a multitude of databases, each of which may be partially responsive to the query.

Many relational databases, such as in social networks, grow rapidly as data changes with respect to participants and their various natures, features, qualities, and the like. Such a network may be represented by a massive graph, where nodes are connected by edges to other nodes, and both the nodes and edges represent associated relational data.

Previously, the searching of these graphs has been laborious, time consuming, and inordinately and exhaustively detailed, requiring the individual treatment and assessment of each of a multiplicity of nodes and edges. Thus, there is a need for a more effective, efficient, and inexpensive structure, technique, and methodology for undertaking a query in such graphs and networks, such as a computation of the shortest path between nodes.

OVERVIEW

Embodiments disclosed herein provide systems, methods, and software for determining the shortest distance between vertices in relatively large graphs. In an embodiment a method includes identifying an original graph comprising a plurality of nodes and a plurality of edges, identifying a plurality of hub nodes from within the original graph, creating a hub matrix comprising the plurality of hub nodes and the shortest distance between the plurality of hub nodes, and determining a shortest distance between the at least two nodes using the original graph and/or the hub matrix.

In another embodiment, one or more computer readable storage media having program instructions stored thereon for determining the least number of intermediate nodes between at least two vertices on a relatively large graph that, when executed by a computing system, direct the computing system to at least identify an original graph comprising a plurality of nodes and a plurality of edges, identify a plurality of hub nodes from within the original graph, create a hub matrix comprising the plurality of hub nodes and a shortest distance between the plurality of hub nodes, estimate the distance between at least two nodes in the original graph using at least the hub matrix, and determine the shortest distance between the at least two nodes using the original graph, without using the hub nodes.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
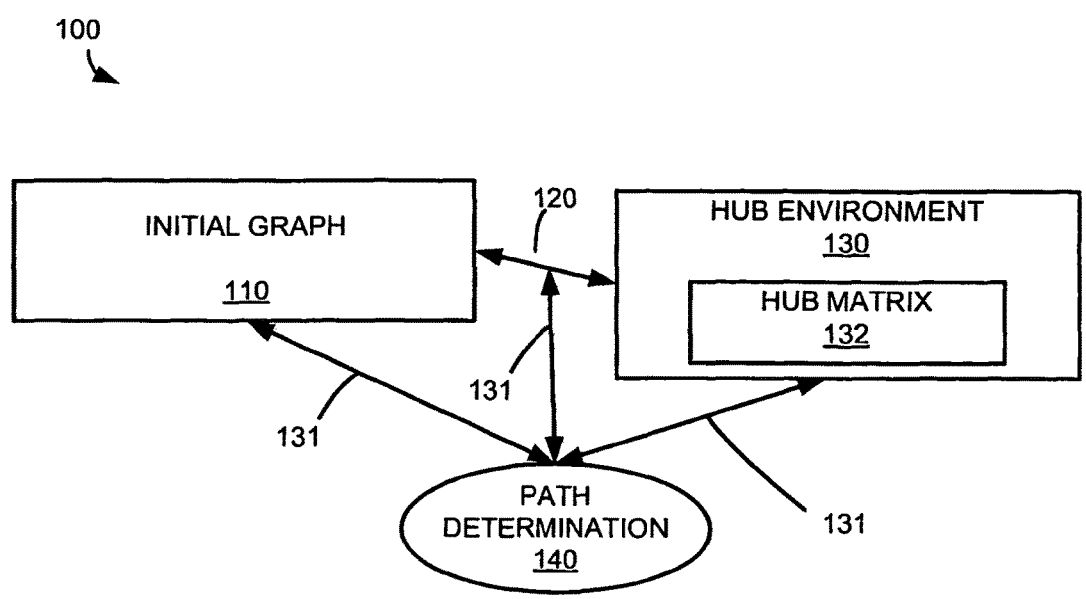
FIG. 1 illustrates an environment for determining the shortest path between nodes according to one example.

FIG. 1 illustrates a graph environment 100 according to one example. Graph environment 100 includes an original graph 110, determined hub nodes 120, hub environment 130, and path determination environment 140.

Original graph 110 may comprises vertices/nodes and edges. It may include relational database characteristics. Path determination environment 140 can comprise one or more computer systems configured to query and/or use information from the original graph 110, determined hub nodes 120, and/or hub environment 130. Examples of path determination environment 140 can include desktop computers, laptop computers, processors, computing systems, or any other like device.

An original graph 110 may be identified. A computing system at hub environment 130 or path determination environment 140 may then identify or determine which nodes are to be hub nodes 120. The hub nodes 120 can be used to create a hub matrix 132 in hub environment 130.

Path determination environment 140 may then compute a shortest path between two nodes within the original graph 110, using at least one of the original graph 110, determined hub nodes 120, hub matrix 132, and/or hub environment 130.

Hub environment 130 may include a hub matrix 132 as well as a hub network. Furthermore, shortest path may be determined faster with hub matrix 132 and hub network than reachability within original graph 110 alone.

Path determination environment 140 may communicate with original graph 110, determined hub nodes 120, and/or hub environment 130 via communications links 131. Path determination environment 140 comprises one or more computer systems configured to determining the shortest path between nodes of the original graph using the original graph 110, determined hub nodes 120, and/or hub matrix 132 as well as a hub network. Path determination environment 140 and hub environment 130 can include server computers, desktop computers, laptop computers, computing systems, processors, or any other similar device—including combinations thereof.

Communication links 131 can use metal, glass, air, space, or some other material as the transport media. Communication links 131 may use various communication protocols, such as Internet Protocol (IP), Ethernet, communication signaling or any other communication format—including combinations thereof.

Although original graph 110, hub environment 130, and path determination environment 140 are illustrated as separate environments, graph environment 100 may be implemented in any number of environments, or configurations and may be implemented using any number of computing systems.

Figure 2:
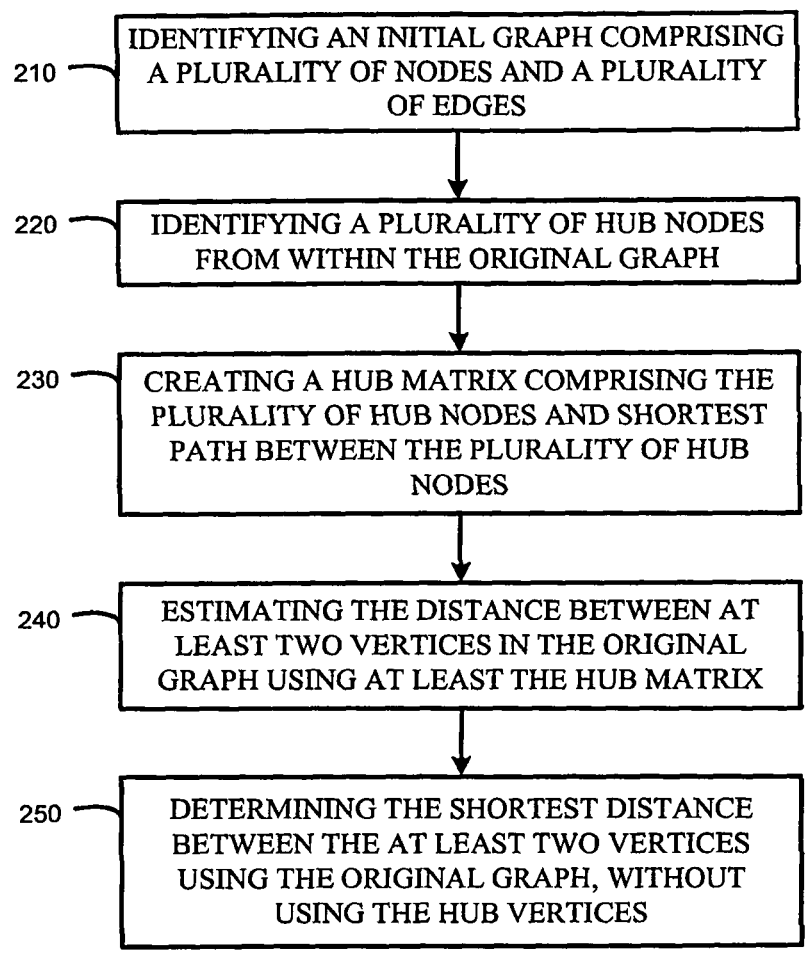
FIG. 2 illustrates a method for determining the shortest path between nodes according to one example.

FIG. 2 illustrates a method for graph environment 100 according to one example. In operation path determination environment 140 can identify an original graph 110, which can include nodes and edges (step 210). In some examples path determination environment 140 can calculate if nodes can be reached and the shortest path between nodes. Such calculations can include a function designed to find if there is a path between one item in relational data (a vertice) to another data item in relational data (a second vertice), and the shortest path, or smallest number of connected nodes between the vertices.

Path determination environment 140 and/or hub environment 130 can identify hub nodes 120 from within the original graph 110 (step 220). The hub nodes 120 may be identified in part by determining the number of other nodes the prospective hub is connected to by edges, and others as described later in this disclosure.

Path determination environment 140 and/or hub environment 130 can create a hub matrix 132 comprising hub nodes 120 and the shortest path, and/or smallest number of connected nodes between the hub nodes 120, using at least the hub nodes 120 identified in step 220 (step 230). In an example, hub matrix 132 may include hub nodes 120 and the shortest distances between the hub nodes 120. Hub environment 130 may also include a hub network to be used to determining the shortest path between nodes.

Path determination environment 140 and/or hub environment 130 can estimate the distance between two nodes using at least the hub matrix 132 (step 240). In an example, path determination environment 140 will calculate a "high" estimate of the distance between two nodes by using a bidirectional breadth first search of the hub matrix 132.

Path determination environment 140 and/or hub environment 130 can determine the distance between two nodes using at least original graph 110 (step 250). In an example, the original graph 110 may be searched by using a bidirectional breadth first search of the original graph 110, excluding hub nodes. The estimated "high" distance will be used to terminate this shortest path determination one the estimate is reached. This step 250 will try to determine if there is a shorter path between the two nodes without using the hub nodes. The shortest path using the hub nodes was determined in step 240.

Figure 3:
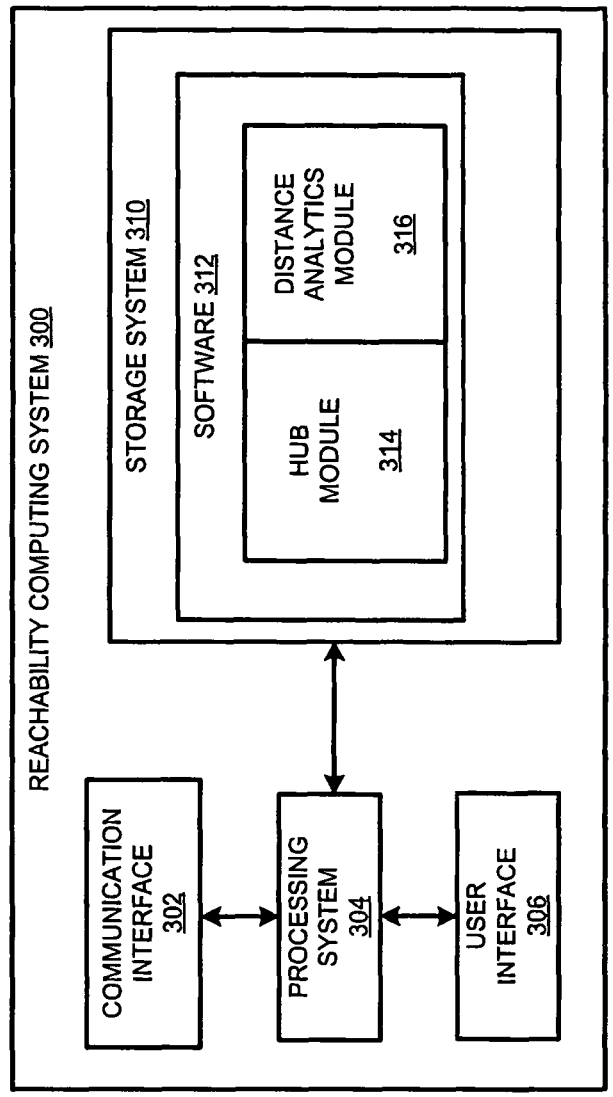
FIG. 3 illustrates a computing system capable of determining the shortest path between nodes according to an example.

FIG. 3 illustrates a shortest path computing system 300 according to one example. Shortest path computing system 300 can include communication interface 302, processing system 304, user interface 306, storage system 310, and software 312. Processing system 304 loads and executes software 312 from storage system 310.

Software 312 can include hub module 314 and distance analytics module 316. Software 312 may further include an operating system, utilities, drivers, network interfaces, applications, or some other type of software. When executed by unified shortest path computing system 300, software modules 314 and 316 direct processing system 304 to operate as a graph environment 100 as described in FIGS. 2 and 6 and the rest of this disclosure.

Although unified shortest path computing system 300 includes two software modules in the present example, it should be understood that any number of modules could provide the same operation. Communication interface 302 can communicate using Internet Protocol (IP), Ethernet, communication signaling, or any other communication format.

Referring still to FIG. 3, processing system 304 can comprise a microprocessor and other circuitry that retrieves and executes software 312 from storage system 310. Processing system 304 can be implemented within a single processing device, but can also be distributed across multiple processing devices or sub-systems, such as hub environment 130 and path determination environment 140, that cooperate in executing program instructions. Examples of processing system 304 include general-purpose central processing units, application specific processors, and logic devices, as well as any other type of processing device, combinations of processing devices, or variations thereof.

Storage system 310 can comprise any storage media readable by processing system 304, and capable of storing software 312. Storage system 310 can include volatile and nonvolatile, removable and non-removable media implemented in any method or technology for storage of information, such as computer readable instructions, data structures, program modules, or other data. Storage system 310 can be implemented as a single storage device, but may also be implemented across multiple storage devices or sub-systems. Storage system 310 can comprise additional elements, such as a controller, capable of communicating with processing system 304.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

User interface 306 can include a mouse, a keyboard, a camera, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in user interface 306. The aforementioned user input and output devices are well known in the art and need not be discussed at length here. In some examples, user interface 306 can be omitted.

It should be understood that although shortest path computing system 300 is illustrated as a single system for simplicity, the system can comprise one or more systems. For example, in some embodiments hub module 314 and distance analytics module 316 may be divided into separate systems.

Shortest path computing system 300 may be used in conjunction with, or be an example of, path determination environment 140 and/or hub environment 130, and/or other computing system, and/or combinations thereof.

In at least one example, the distance analytics module 316 may include a shortest path function. Such a function will determine if shortest path between one data item to another data item in original graph 110, hub environment 130, and/or hub matrix 132.

Figure 4:
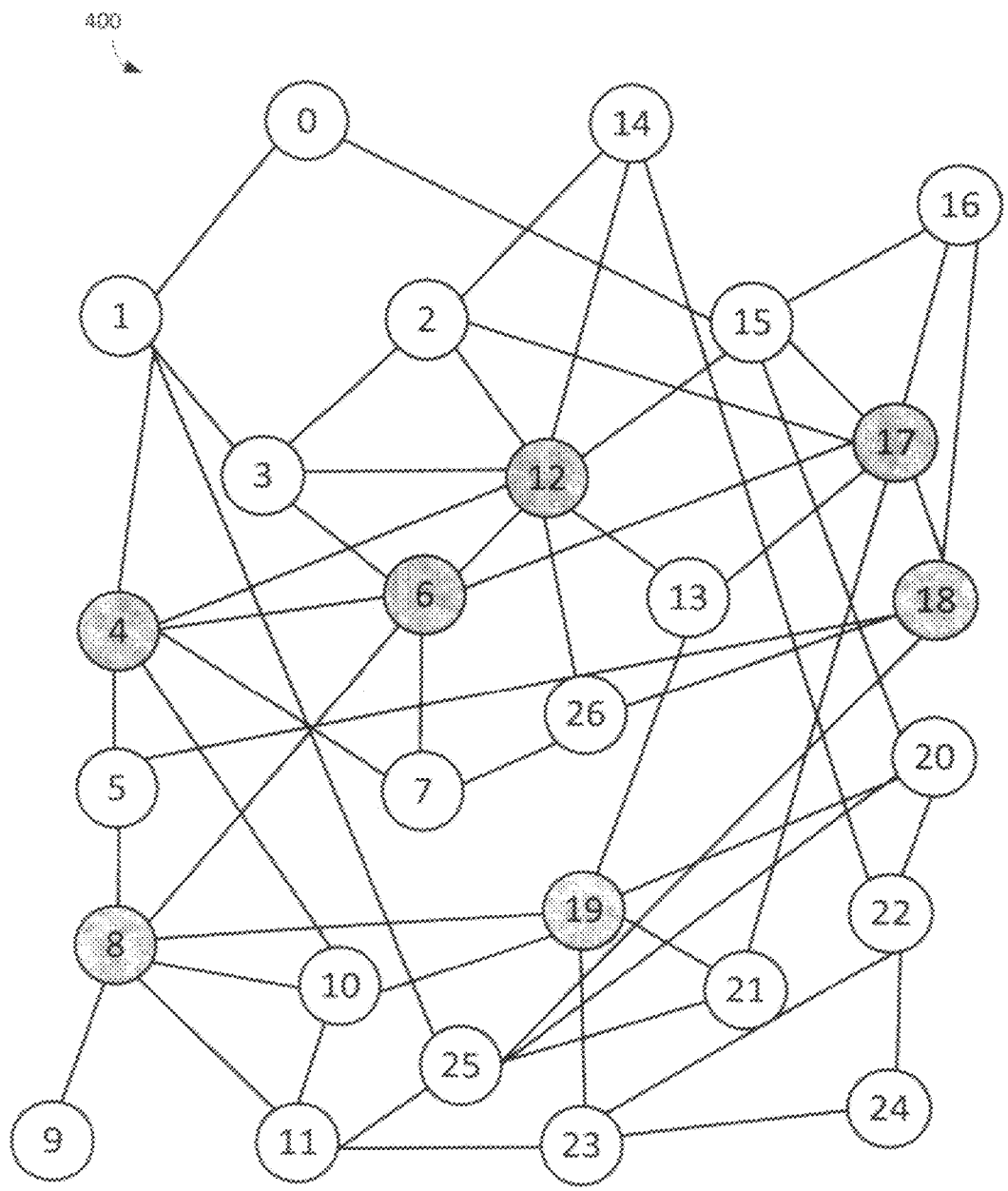
FIG. 4 illustrates an original graph according to an example.

FIG. 4 illustrates an original graph 400 according to an example. Original graph 400 is relatively small for illustrative purposes, having only 26 nodes. An actual original graph may be much larger.

Figures 5, 6:
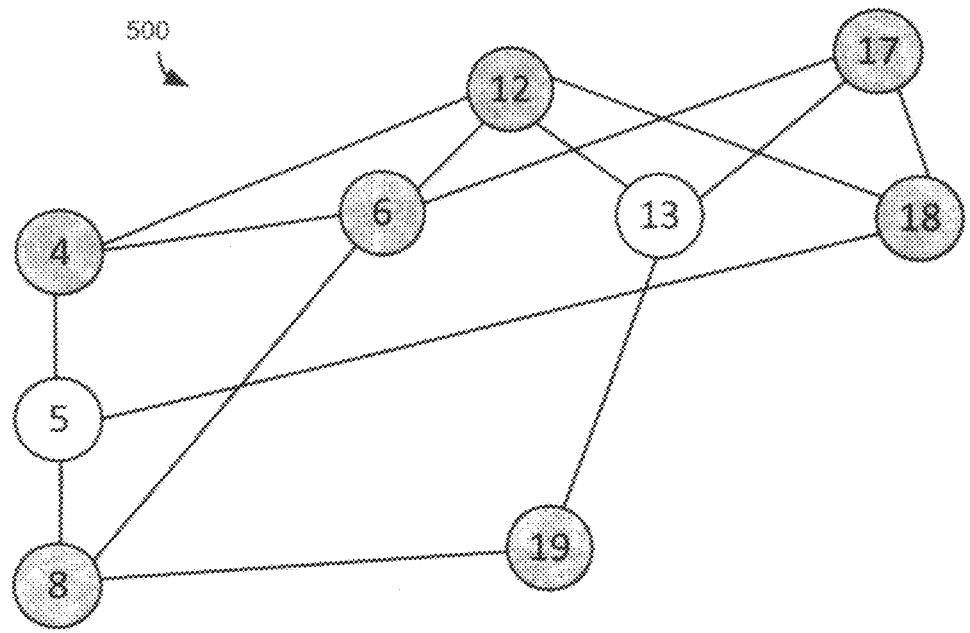
FIG. 5 illustrates a hub network according to an example.
FIG. 6 illustrates hub labeling according to an example.

FIG. 5 illustrates an example of a hub network 500 according to an example. Here the hub nodes are 4, 6, 8, 12, 17, 18, and 19.

FIG. 6 illustrates an example of hub labeling 600 based at least in part on the example original graph 400 in FIG. 4 and hub network 500 in FIG. 5. Here the hub nodes are 4, 6, 8, 12, 17, 18, and 19. For instance, node 1 only needs to record core-hubs 4, 6, 12 and 19, and it can reach hubs 8 and 17 through them in some shortest path. Determination of the hub nodes, or core hubs, is described later in this disclosure, as well as creating of the hub matrix.

Figure 7:
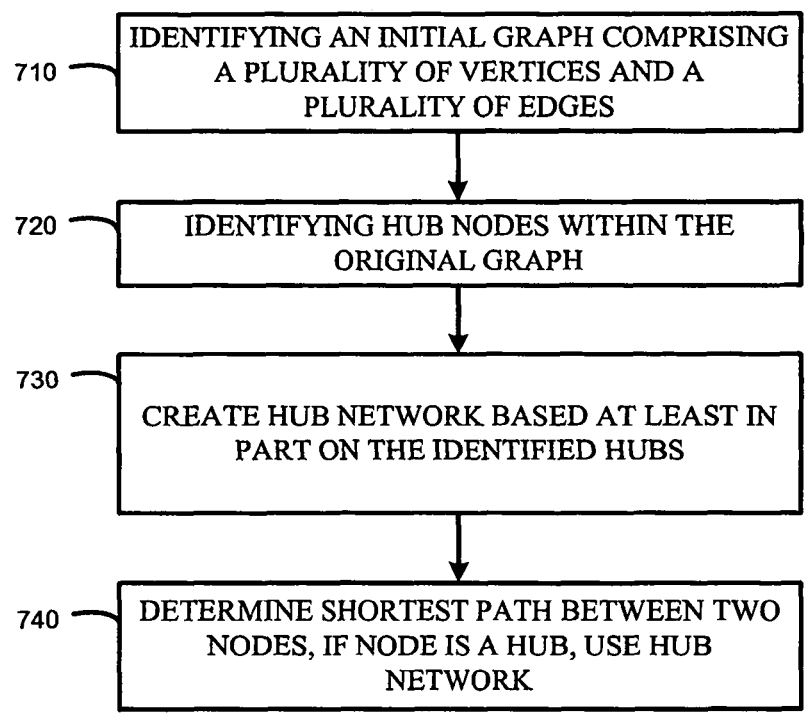
FIG. 7 illustrates a method for determining the shortest path between nodes according to one example.

FIG. 7 illustrates a method for determining the shortest path between nodes according to one example. In operation path determination environment 140 can identify an original graph 110, which can include nodes and edges (step 710). In some examples, path determination environment 140 can calculate if nodes can be reached and the shortest path between nodes. Such calculations can include a function designed to find if there is a path between one item in relational data (a vertice) to another data item in relational data (a second vertice), and the shortest path, or smallest number of connected nodes, between the vertices.

Path determination environment 140 and/or hub environment 130 can identify hub nodes 120 from within the original graph 110 (step 720). The hub nodes 120 may be identified in part by determining the number of other nodes the prospective hub is connected to by edges, and others as described later in this disclosure.

Path determination environment 140 and/or hub environment 130 can create a hub network comprising hub nodes 120 and the shortest between the hub nodes 120, using at least the hub nodes 120 identified in step 720 (step 730). Hub environment 130 may also include a hub network to be used to determining the shortest path between nodes.

Path determination environment 140 and/or hub environment 130 can determine the distance between two nodes using at least original graph 110 (step 740). In an example, the original graph 110 may be searched using by using a bidirectional breadth first search of the original graph 110. If either of the two nodes is a hub node, the hub network may be used to determine the shortest path. The use of the smaller hub network may reduce the time and resources needed to determine the shortest path.

Shortest path analysis and calculation is performed by a graph engine in a graph or other environment, all executed by a computing system/processor.

In a particular example, the systems and environments of FIGS. 1-9 use a hub environment for determining the shortest path between nodes, and graph analytics and has the following unique features:

Shortest path computation is one of the most fundamental operations for managing and analyzing large social networks. Though existing techniques are quite effective for finding the shortest path on large but sparse road networks, social graphs have quite different characteristics: they are generally non-spatial, non-weighted, scale-free, and they exhibit small-world properties in addition to their massive size. In particular, the existence of hubs, those vertices with a large number of connections, explodes the search space, making the shortest path computation surprisingly challenging. In this disclosure introduces is a set of techniques centered around hubs, collectively referred to as the Hub-Accelerator framework, to compute the k-degree shortest path (finding the shortest path between two vertices if their distance is within k). These techniques enable a significant reduction in the search space by either greatly limiting the expansion scope of hubs (using the novel distance-preserving Hub-Network concept) or completely pruning away the hubs in the online search (using the $Hub^2$-Labeling approach). The Hub-Accelerator approaches are more than two orders of magnitude faster than BFS and the state-of-the-art approximate shortest path method Sketch for the shortest path computation. The Hub-Network approach does not introduce additional index cost with light pre-computation cost; the index size and index construction cost of $Hub^2$-Labeling are also moderate and better than or comparable to the approximation indexing Sketch method.

1. Introduction

Social networks may be becoming ubiquitous and their data volume is increasing dramatically. The popular online social network web-sites, such as Facebook®, Twitter®, and LinkedIn®, all have hundreds of millions of active users. Google's® new social network Google+® attracted 25 million unique users and was growing at a rate of roughly one million visitors per day in the first month after launch. Enabling online and interactive query processing of these massive graphs, especially to quickly capture and discover the relationship between entities, is becoming an indispensable component for emerging applications ranging from the social sciences to advertisement and marketing research, to homeland security.

Shortest path computation is one of the most basic, yet critical, problems for managing and querying social networks. The social network website LinkedIn® pioneered the well-known shortest-path service "How you're connected to A", which offers a precise description of the friendship chain between you and a user A within 3 steps. Microsoft's® Renlifang® (EntityCube), which records over a billion relationships for over 10 million entities (people, locations, organizations), allows users to retrieve the shortest path between two entities if their distance is less than or equal to 6. The newly emerged online application "Six Degrees" provides an interactive way to demonstrate how people connect to other people on the Facebook® network. In addition, shortest path computation is also useful in determining trust and discovering friends in online games.

In this disclosure, the k-degree shortest path query (k≤6 in general) is investigated. This may be formally described as: Given two vertices (users) s and t in a large (social) network, what is the shortest path from s to t if their distance is less than or equal to k? In all these emerging social network applications, (one) shortest path between two users needs to be computed generally only if their distance is less than a certain threshold (such as 6). Such a focus directly resonates with the small-world phenomenon being observed in these massive social networks. For instance, the average pairwise distance on a large sample of Facebook users has been shown to be only 5.73. Also, around half the users on Twitter are on average 4 steps away from another while nearly everyone is 5 steps away. Not only are most of the users in large social networks separated by less than 6 steps, the longer connections or paths in social networks are also less meaningful and/or useful.

Computing k-degree shortest path in a large social network is surprisingly challenging, especially when k is relatively large, such as k=6. A single BFS (Breadth-First-Search) can easily visit more than a million vertices in 6 steps in a large network with a few million of vertices. Though existing techniques are very effective for finding the shortest path on large but sparse road networks, social graphs have quite different characteristics. Instead of being spatial, with edge weight, and having low vertex degree, social networks are generally non-spatial, non-weighted, scale-free (therefore containing high-degree hub nodes), and they exhibit small-world proper-ties in addition to their massive size. Indeed, due to the difficulty in finding the shortest path in social networks, the recent studies all focus on discovering only the approximate ones (longer than the true shortest path). Furthermore, even with the approximation, the fastest methods, such as Sketch, TreeSketch, and RigelPaths, still need tens or hundreds of milliseconds ($10^{-3}$ second) to compute an approximate shortest path in a social network with a few million vertices.

The central problem of shortest path computation in massive social network comes from hubs: those vertices with a large number of connections. The number of hubs may be small compared to the total network size; however, they appear in the close neighborhood of almost any vertex. Indeed, hubs play a critical role in the small-world social networks; they serve as the common mediators linking the shortest path between vertices, just like the hub cities in the small-world network of airline flight. In fact, theoretical analysis shows that a small number of hubs (due to the power law degree distribution) significantly shortens the distance between vertices and makes networks "ultra-small". However, hubs are the key contributing factor to the search-space explosion. Assuming a hub has 5,000 friends and normal persons have about 100 friends, then a two-step BFS from the hub will visit≈500,000 vertices; in the Twitter network, some vertices (celebrities) contain more than 10 million followers, so a reverse one-step BFS (from that vertex to its followers) is already too expensive. Thus, hubs are at the center of the problem: shortest paths do not exist without them; but they make the discovery extremely hard.

In this disclosure, provided is a positive answer to these challenging problems on shortest path computation in massive social graphs. Introduced is a list of novel techniques centered around hubs, collectively referred to as the Hub-Accelerator framework. These techniques enable a significant reduction the search space by either greatly limiting the expansion scope of hubs (using the novel distance-preserving hub-network concept) or completely pruning away the hubs in the online search (using the $Hub^2$-labeling approach). The Hub-Accelerator approaches are on average more than two orders of magnitude faster than the BFS and the state-of the-art approximate shortest path methods, including Sketch, TreeSketch, and RigelPaths. The Hub-Network approach does not introduce additional index cost with light pre-computation cost; the index size and index construction cost of $Hub^2$-Labeling are also moderate and better than or comparable to the approximation indexing Sketch method. Noted is that although the shortest path computation has been extensively studied, most of the studies only focus on road networks or approximate shortest path (distance) computation on massive social networks. This may be the first work explicitly addressing the exact shortest path computation in these networks. The Hub-Accelerator techniques are also novel and the distance-preserving subgraph (hub-network) discovery problem itself is of both theoretical and practical importance for graph mining and management.

2. Related Work

In the following, reviewed are the existing methods on shortest path computation, especially those related to social networks. Throughout this disclosure, n and m are used to denote the number of nodes and edges in the graph G, respectively.

Online Shortest Path Computation:

One of the most well-known methods for shortest path computation is Dijkstra's algorithm. It computes the single source shortest paths in a weighted graph and can be implemented with O(m+n log n) time. If the graph is unweighted (as are many social networks), a Breadth-First Search (BFS) procedure can compute the shortest path in O(m+n). However, it is prohibitively expensive to apply these methods to a social network with millions of vertices, even when limiting the search depth to 6 steps. First, the average degree in the social network is relatively high. For instance, each user in Facebook on average has about 130 friends. A straightforward BFS would easily scan one million vertices within 6 steps. A simple strategy is to employ bidirectional search to reduce the search space. Second, due to the existence of hubs and the small-world property, a large number of hubs may be traversed in bidirectional BFS (even within three steps of the start s or end t of the shortest path query). For instance, in the Orkut graph (a frequently used benchmarking social network), which consists of over 3 million vertices and 220 million edges, a bidirectional BFS still needs to access almost 200K vertices per query while traditional BFS needs to access almost 1.6 million vertices per query.

Shortest Path Computation on Road Networks:

Computing shortest path on road networks has been widely studied. Provide herein may be only a short review. A more detailed review on this topic can be found in. Several early studies, such as HEPV and HiTi, utilize the decomposition of a topological map to speed up shortest path search.

Recently, a variety of techniques, such as A*, Arc-flag (directing the search towards the goal), highway hierarchies (building shortcuts to reduce search space), transit node routing (using a small set of vertices to relay the shortest path computation), and utilizing spatial data structures to aggressively compress the distance matrix, have been developed. However, the effectiveness of these approaches rely on the essential properties of road networks, such as almost planar, low vertex degree, weighted, spatial, and existence of hierarchical structure. As mentioned before, social networks have different properties, such as non-spatial, unweighted, scale-free (existence of hubs), and exhibiting small-world properties. For instance, those techniques utilizing spatial properties (triangle inequality) for pruning the search space immediately become infeasible in social networks. Also, the high vertex degree (hubs) easily leads to the explosion of the search space.

Theoretical Distance Labeling and Landmarking:

There have been several studies on estimating the distance between any vertices in large (social) networks. These methods in general belong to distance-labeling, which assigns each vertex u a label (for instance, a set of vertices and the distances from u to each of them) and then estimates the shortest path distance between two vertices using the assigned labels. The seminal work, referred to as the distance oracle, by Thorup and Zwick shows a (2k−1)-multiplicative distance labeling scheme (the approximate distance is no more than 2k−1 times the exact distance), for each integer k≥1, with labels of $O(n^{1/k} \log^2 n)$ bits. However, as Potamias et al. argued, for practical purposes, even k=2 is unacceptable (due to the small-world phenomenon). Recently, Sarma et al. studied Thorup and Zwick's distance oracle method on real Web graphs and they found that this method can provide fairly accurate estimation.

The pioneering 2-hop distance method by Cohen et al. pro-vides exact distance labeling on directed graphs (very similar to the 2-hop reachability indexing). Specifically, each vertex u records a list of intermediate vertices $L_{out}(u)$ it can reach along with their (shortest) distances, and a list of intermediate vertices $L_{in}(u)$ which can reach it along with their distances. To find the distance from u to v, the 2-hop method simply checks all the common intermediate vertices between $L_{out}(u)$ and $L_{in}(v)$ and chooses the vertex p, such that dist(u, p)+dist(p, v) is minimized for all p∈$L_{out}(u) \cap L_{in}(v)$. However, the computational cost to construct an optimal 2-hop labeling is prohibitively expensive.

Several works use landmarks to approximate the shortest path distance. Here, each vertex precomputes the shortest distance to a set of landmarks and thus the landmark approach can be viewed as a special case of 2-hop and distance labeling where each vertex can record the distance to different vertices. Potamias et al. investigate the selection of the optimal set of landmarks to estimate the shortest path distance. Qiao et al. observe that a globally-selected landmark set introduces too much error, especially for some vertex pairs with small distance, and so propose a query-load aware landmark selection method. Zhao et al. introduce Rigel, which utilizes a hyperbolic space embedding on top of the landmark to improve the estimation accuracy.

Approximate Shortest Path Computation in Social Networks:

A few recent studies aim to compute the shortest path in large social networks. They extend the distance-labeling or the Landmarking approach to approximate the shortest paths. Gubichev et al. propose Sketch, which generalizes the distance oracle method to discover the shortest path (not only the distance) in large graphs. They observe that the path lengths are small enough to be considered as almost constant and therefore store a set of precomputed shortest path in addition to the distance labeling. They also propose several improvements, such as cycle elimination (SketchCE) and tree-based search (TreeSketch), to boost the shortest path estimation accuracy. Zhao et al. developed RigelPath to approximate the shortest path in social networks on top of their distance estimation method, Rigel. Their basic idea is to use the distance estimation to help determine the search direction and prune search space. Sketch is the fastest approximate shortest path method, though RigelPath and TreeSketch can be more accurate. In addition, RigelPath mainly focuses on the undirected graph, while Sketch can handle both directed and undirected graphs.

Other Recent Progress on Shortest Path Computation:

Very recently, there have been a few studies in the database research com-munity on shortest path and distance computation. Wei develops a tree decomposition indexing structure to find the shortest paths in an unweighted undirected graph; a hierarchical vertex-cover based approach is developed for single-source on-disk shortest path (distance) computation. Cheng et al. introduce k-reach problem, which provides binary answer to whether two vertices are connected by k steps. Also, the k-reach indexing approach developed in [6] is not scalable and can only handle small graphs (as it tries to materialize the vertex pairs within certain distance threshold). Finally, Jin et al. [19] propose a highway-centric labeling (HCL) scheme to efficiently compute distance in sparse graphs. Leveraging highway structure, this distance labeling offers a more compact index size compared to the state-of-the-art 2-hop labeling, and is also able to provide both exact and approximate distance with bounded accuracy. However, it is hard to scale to large social networks, as real social networks are generally not sparse and potentially lead to expensive index construction cost and large index size.

3. Hub-Accelerator Framework

Included in this section is an overview of the Hub-Accelerator (HA) framework for the shortest path computation. In the earlier discussion, observed was a love-hate relationship between shortest-path and hubs: on one hand, any shortest paths likely contain some hubs and thus need to be visited in the shortest path search process; on the other hand, in order to provide the fast shortest path search, it is needed to try to avoid a full expansion of hub nodes. In general, the notation of hubs is rather informal though generally based on degree; in this disclosure, the set of vertices whose degree are the highest (top β number of vertices; β is a constant and can be specified).

The design of Hub-Accelerator aims to utilize these hubs for shortest-path computation without fully expanding their neighborhoods. To achieve this, the following research questions need to be answered:

1. How can the expansion of hubs be limited during the shortest path search? A hub may have thousands or even millions of connections (neighbors); what neighbors should be considered to be essential and given high priority in the shortest path search? To address this question, the hub-network notation is formulated, which captures a high-level view of the shortest path and topology between these hubs. The hub-network can be considered a highway structure anchored by hubs for routing the shortest paths in a massive social network. Due to the importance of hubs, most shortest paths between non-hub vertex pairs may need go through such a network, i.e., the starting vertex reaches a hub (as the highway entry), then travels to another hub (as the highway exit), and finally leaves the highway reaching the destination. In other words, the hub-network can be used to limit (or prioritize) the neighbors of hubs; a hub should only expand within the hub-network.

2. How can the hub-network for shortest path search be effectively and efficiently utilized? Note that the hub-network captures the shortest paths between hubs. However, not all shortest paths between vertices need to go through the hub-network: they may not contain any hub or they may consist of only one hub (in the later case, no traversal may be needed in the hub network). Thus, the problem is how can the typical bidirectional BFS be extended to adopt the hub-network for speeding up the shortest path computation?

3. Can the expansion of hubs be completely avoided? In this way, even the hub-network becomes unnecessary. But what essential information should be precomputed? When the number of hubs is not large, say 10K, then the pair-wise distance matrix between hubs may be materialized. For 10K hubs, this only costs about 100 MB=10K×10 Kb (assuming the distance can be held in 8 bits), but additional memory may be needed to recover the shortest path. Given this, how can bidirectional search take advantage of such a matrix and what other information may also need to be precomputed?

In this disclosure, by investigating and solving these problems, the hubs can be utilized to effectively accelerate the shortest path search while significantly reducing or avoiding the cost of expanding them. Specifically, the following discoveries are made:

Hub-Network Discovery (Section 4): The concept of hub-network is at the heart of the Hub-Accelerator framework: given a collection of hubs, a distance-preserving subgraph seeks to extract a minimal number of additional vertices and edges from the original graphs so that the distance (and shortest path) between hubs can be recovered, i.e., their distances in the hub-network are equivalent to their distances in the original graph. As mentioned before, the hub-network serves as the highway in the transportation system to enable the acceleration of the shortest path search: any hub will not be fully expanded (in the original graph); instead, only their neighbors in the hub networks will be expanded. Interestingly, though the discovery of a distance-preserving subgraph (and hub-network) seems rather intuitive, the computational aspect of the problem has not been studied before (despite similar notions being defined in theoretical graph theory). In Section 4, shown is the NP-hardness of discovering the minimal distance-preserving subgraph and developed is a fast greedy approach to extract the hub-network (and the distance-preserving subgraph). The results show the degree of hubs in the hub-network is significantly lower than that in the original graph; thus the hub-network can limit the expansion of hubs and enables faster shortest path computation.

Hub-Network based Bidirectional BFS (Section 5) As mentioned above, it is nontrivial to incorporate the hub-network into the bi-directional BFS. In general, if the hub-network is used and also expand the hubs within the network, then the searches in both directions cannot simply be stopped when they meet at a common vertex. This is because the hub-network does not capture those shortest paths consisting of only one hub.

Hub$^2$-Labeling (Section 6): In this technique, the speed boundary is increased for shortest path computation by completely avoiding expanding any hub. To achieve this, a more expensive though often affordable precomputation and memory cost is used for faster online search. It consists of three basic elements: 1) First, instead of extracting and searching the hub-network, this technique materializes the distance matrix of those hubs, referred to as the Hub$^2$ matrix. As mentioned before, even for 10K hubs, the matrix can be rather easily materialized. 2) Hub-Labeling is introduced so that each vertex will precompute and materialize a small number of hubs (referred to as the core-hubs) which are essential for recovering the shortest path using hubs and hub-matrix. 3) Given the Hub$^2$ distance matrix and hub-labeling, a faster bidirectional BFS can be performed to discover the exact k-degree shortest path. It first estimates a distance upper bound using the distance matrix and the hub labeling. No hub needs to be expanded during the bidirectional search, i.e., hub-pruning bidirectional BFS.

4. Hub-Network Discovery

In this section, we formally define the Hub-Network (Subsection 4.1) and present an efficient approach to discover it (Subsection 4.2).

To facilitate the disclosure the following notation is introduced.

Let $G=(V,E)$ be a graph where $V=\{1, 2, \ldots n\}$ is the vertex set and $E \subseteq V \times V$ is the edge set. The edge from vertex u and v is denoted by (u, v), and used is $P(v_0, v_p)=(v_0, v_1, \ldots, v_p)$ to denote a simple path between $v_0$ and $v_p$. The length of a simple path is the number of edges in the path, denoted by $|P(v_0, v_p)|$. Given two vertices u and v, their shortest path SP(u, v) is the path between them with the minimal length. The distance from vertex u to v is the length of shortest path SP(u, v) between u and v, denoted by d(u, v). Note that for a directed graph, the edge set may contain either (u, v), (v, u), or both. For an undirected graph, the edge has no direction; in other words, it can be considered bidirectional, so the edge set contains either both edges (u, v) and (v, u) or neither of them. In undirected graph, the shortest path distance from u to v is equivalent to the one from v to u, i.e., d(u, v)=d(v, u). The techniques discussed herein can be applied both undirected and directed graph; for simplicity, the undirected graph is focused upon and briefly mentioned is how each technique can be naturally extended to handle directed graphs.

4.1 Distance-Preserving Subgraph and Hub-Network

Intuitively, a hub-network is a minimal subgraph of the original G, such that at least one shortest path between two hubs can be recovered in the subgraph (the distance is preserved). To formally define the hub-network, the concept of distance-preserving subgraph and its discovery is introduced.

Definition 1. Distance-Preserving Subgraph

Given graph $G=(V,E)$ and a set of vertex pairs $D=(u, v) \subseteq V \times V$, a distance-preserving subgraph $G_s=(V_s,E_s)$ of G ($V_s \subseteq V$ and $E_s \subseteq E$) has the following property: for any (u, v) 2 D, $d(u, v|G_s)=d(u, v|G)$, where $d(u, v|G_s)$ and $d(u, v|G)$ are the distances in subgraph $G_s$ and original graph G, respectively.

Given a collection of vertex pairs whose distance need to be preserved in the subgraph, the subgraph discovery problem aims to identify a minimal subgraph in terms of the number of vertices (or edges).

Definition 2. Minimal Distance-Preserving Subgraph (MDPS) Problem Given graph $G=(V,E)$ and a set of vertex pairs $D=(u, v) \subseteq V \times V$, the minimal distance-preserving subgraph (MDPS) problem aims to discover a minimal subgraph $G^*_s=(V^*_s,E^*_s)$ with the smallest number of vertices, i.e., $G^*_s=\text{argmin}_{|V_s|} G_s$, where $G_s=(V_s,E_s)$ is a distance-preserving subgraph with respect to D.

Once all the vertices $V^*_s$ are discovered, the induced subgraph $G[V^*_s]$ of G is a candidate minimal subgraph. Note that its edge set may be further sparsified. However, the edge sparsification problem with respect to a collection of vertex pairs (equivalent to the minimal distance-preserving subgraph problem in terms of the number of edges) is equally difficult as the MDPS problem (see discussion below); and the number of edges which can be removed are typically small in the unweighted graph. Thus, the further edge reduction in this disclosure is not explored. Given graph $G=(V, E)$ and a set of hubs $H \subseteq V$, let Dk contain all the hub pairs whose distance is no greater than k, then the hub-network is defined as the minimal distance-preserving sub-graph of $D_k$ in G.

Example 4.1

FIG. 4 shows the network and will used as a running example. FIG. 5 is the corresponding hub-network with H={4, 6, 8, 12, 17, 18, 19} (degree ≥5) when k=4. Since the pairwise distances between these hubs are all less than 4, $D_4$ contains all the hub pairs with a total of 15 vertex pairs.

Note that an alternative approach is to build the weighted hub-network which explicitly connects the hub pairs: for instance, if any other hub lies in a shortest path between two hubs, an edge can be added to directly link them. Indeed, most of the existing studies have adopted a similar approach to build and utilize some highway structure (but targeted mainly road networks, which are rather sparse). However, this approach can lead to a number of problems when searching a massive social network: 1) Such hub-network would be weighted and could be dense (many new edges may need to be added between hubs) and to search through it, Dijkstra's algorithm (or its variant) must be utilized and would be slower than BFS (because of using the priority queue). Higher edge density ex-acerbates this slowdown. 2) Bidirectional BFS is typically used to search an unweighted network and could be adopted to search the remaining network (excluding the hub-network). However, combining bidirectional BFS with Dijkstra's can be rather difficult; 3) Significant memory may be needed to record such a hub-network as it is rather dense. Moreover, to recover the shortest path, additional information has to be recorded for each added new edge. Considering these issues, the distance-preserving subgraph as the hub-network is utilized, which does not induce additional memory cost, and can naturally support (bidirectional) BFS. Note that in Sections 5 and 6, we will study how to use more memory for higher query performance (without involving the difficulty of weighted hub-network).

To discover the hub-network in a massive social network, a fast solution for the Minimal Distance-Preserving Subgraph (MDPS) problem is needed. However, finding the exact optimal solution is hard.

Theorem 1.

Finding the minimal distance-preserving subgraph of a collection D of vertex pairs in a graph is an NP-hard problem.

Proof Sketch:

The set-cover decision problem r is reduced to the decision version of the minimal distance-preserving subgraph problem. In the set-cover decision problem, let $\mathcal{U}$ be the ground set and C records all the candidate sets, where for any candidate set C∈C and $C \subseteq \mathcal{U}$. The set-cover decision problem asks whether there are K or fewer candidate sets in C, such that $\cup_i C_i = \mathcal{U}$.

The following MDPS instance is constructed based on a set cover instance: consider a tripartite graph G=(X∪Y∪Z, $E_{XY} \cup E_{YZ}$) where the vertices in X and Z have one-to-one correspondence to the elements in the ground set $\mathcal{U}$, and the vertices in Y one-to-one correspond to the candidate sets in C. For simplicity, let $u \in \mathcal{U} \leftrightarrow x_u \in X (z_u \in Z)$ (vertex $x_u$ ($z_u$) corresponds to element u); and let $C \in C \leftrightarrow y_c \in Y$ (vertex $y_c$ corresponds to candidate set C). Then, the edge set $E_{XY}$ ($E_{Y z}$) contains all the edges $(x_u, y_C)$ (($y_C, z_u$)) if element u belongs to the candidate set C. Note that the tripartite graph can be considered symmetric (X≡Z and $E_{XY} \equiv E_{Y Z}$).

The set-cover decision problem is satisfiable if and only if the following MDPS problem is true: there is a subgraph G with 2|U|+K vertices to cover the shortest path distance of |U| vertex pairs $(x_u, z_u)$, u∈U.

The proof of this claim is as follows. Assume the set-cover problem is satisfiable, let $C_1, \ldots C_k$ (k≤K) be the k candidate sets which covers the ground set, i.e., $\cup C_i = U$. Let $Y_C$ include all the vertices in Y corresponding to $C_1, \ldots, C_k$. It is easy to observe the induced subgraph of $G[X \cup Y_C \cup Z]$ can recover the distances of all |U| pairs $(x_u, z_u)$, u∈U. Note that their distances in the original graph G and the induced subgraph $G[X \cup Y_C \cup Z]$ are all equal to 2.

From the other direction, let $G_s$ be the subgraph with 2|U|+K vertices which recovers the distances of these |U| pairs. Since the vertices in pairs have to be included in the subgraph (otherwise, the distance cannot be explicitly recovered), the additional K vertices can only come from the vertex set Y (there are 2|U| in the vertex pairs from X and Z). Note that the distance of $(x_u, z_u)$ in the original graph is 2 and to recover that, a vertex $y_C$ in Y has to appear in the subgraph so that both $(x_u, y_C)$ and $(y_C, z_u)$ are in the subgraph (and in the original graph). This indicates the corresponding candidate set C covers element u. Since there are at most K vertices in Y, there are at most K candidates needed to cover all the ground set U.

Based on similar reduction, also proved is that finding the minimal distance-preserving subgraph in terms the number of the edges is also an NP-hard problem. Due to simplicity, this alternative is not further described.

4.2 Algorithm for Hub-Network Discovery

In the subsection, discussed is an efficient approach for discovering the distance-preserving subgraph and the hub-network. To simplify the discussion, extracting the hub-network is focused upon, though the approach is directly applicable to any collection of vertex pairs (and thus the general distance-preserving subgraph). Recall that in the hub-network discovery problem, given a set H of hubs and a collection D of hub-pairs whose distance is no more than k (for k-degree shortest path search), then the goal is to re-cover the distance for the pairs in D using a minimal (distance-preserving) subgraph.

To tackle the hub-network (and the distance-preserving subgraph) efficiently, the following simple observation is made. For any vertex pairs (x,y) in D, if there is another hub z, such that d(x,y)=d(x,z)+d(z,y), then the vertex pair (x, y) is referred to as a composite pair; otherwise, it is a basic pair, i.e., any shortest path connecting x and y does not contain a hub in H. Let $D_b \subseteq D$ be the set of basic pairs. Given this, it is easy to see that if a subgraph can recover all the vertex pairs in $D_b$, then it is a distance-preserving subgraph of D (and thus the hub-network). This indicates that focus only needs to be on the basic pairs ($D_b$) as the distances of composite pairs can be directly recovered using the paths between basic pairs.

Considering this, at the high level, the algorithm of the hub-network discovery performs a BFS-type traversal for each hub h and it accomplishes the two tasks: 1) during the BFS, all basic pairs including h, i.e., (h, v), v∈H, should be recognized and collected; and 2) once a basic pair (h, v) is identified, the algorithm will select a "good" shortest path which consists of the minimal number of "new" vertices (not included in the hub-network yet). In other words, as the graph from each hub is traversed, the hub-network is gradually augmented with new vertices to recover the distance (shortest path) of the newly found basic pairs.

Recognizing Basic Pairs:

To quickly determine whether the (h, v) is a basic pair during the BFS process starting from hub h, the following observation is utilized: Let vertex y lie on a shortest path from hub h to non-hub vertex v with distance d(h, v)−1 (i.e., y is one hop closer than v with respect to h). If there is a hub h' appearing in a shortest path from h to y (h' and y may not be distinct), h' definitely lies on a shortest path from h to v and (h, v) is a composite pair (not basic pair). Based on this observation, a binary flag b(v) is maintained to denote whether there is another hub appearing in a shortest path between h and v. Specifically, its update rule is as follows: b(v)=0 (not basic pair) if v itself is a hub or b(y)=0 (y is v's parent in the BFS, i.e., d(h, y)=d(h, v)−1 and d(y, v)=1). Thus, during the BFS traversal, when vertex v is visited, if its flag b(v)=1 (true), meaning there is no other hubs lying on the shortest path between h and v, and it is recognized as a basic pair.

Selecting a "Good" Shortest Path Between Basic Pairs:

To select a good shortest path between basic pairs h and v, a basic measurement is the number of "new vertices" that need to be added to the hub-network. As a greedy criterion, the fewer that need to be added, the better is the path. To compute this, for any shortest path from starting point h to v, a score f records the maximal number of vertices which are already in the hub-network. This measure can be easily maintained incrementally. Simply speaking, its update rule is as follows: f(v)=maxf(u)+1 if v itself is in the hub-network or f(v)=maxf(u), where u is v's parent in the BFS (a shortest path from h to v go through u and u directly links to v). Also vertex v records u which has the maximal f for tracking such a shortest path (with maximal number of vertices in the hub-network). Finally, it is noted that only for vertices v with b(v)=1, i.e., when the shortest path between h and v does not go through any other hub, does a score f need to be maintained. Otherwise, v and its descendents cannot produce any basic pairs.

Overall Algorithm:

The outline of this BFS-based procedure for discovering the hub-network is described in Algorithm 1. Here, H is the set recording the vertices in the hub-network. Initially, H*=H and then new vertices will be added during the processing. Note that in the queue for BFS traversal (Line 3), always visited are those vertices with b(u)=0, i.e., they and any of their descendents (in the BFS traversal) will not form a basic pair, and thus the score f does not need to be maintained for them. Once a hub is visited and it initially has b(u)=1, then (h, u) is a basic pair (Line 5); extracted will be the shortest path which has the maximal number of vertices in the hub-network and add the new vertices to H* (Line 6). Now, since the descendent of this hub (in the BFS traversal) will not form a basic pair, its flag is changed to false, i.e., b(u)=0 (Line 7). Also, the shortest path within k-hop is needed, any vertex with distance to h to be k will not be expanded (Lines 9-11). Before the neighbors of u are expanded, its f score needs to be updated based on whether u itself is in the hub-network (Line 12-14).

The complete expansion of a vertex u is from Line 15 to 28. Each of its neighbors v are visited. If v has not been visited, it will be added to the queue for future visiting (Line 16-18). Then the incremental update of flag b(v) is performed and score f(v). Flag b(v) will be turned off if b(u)=0 (Line 20-22) and if f(u) is larger than f(v), i.e., the shortest path from h to u has the largest number of vertices so far in the hub-network. Vertex v will record u as the parent (for shortest path tracking) and f(v) is updated (Line 24-26). This procedure will be invoked for each hub in H.

Algorithm 1 BFSExtraction(G=(V,E), h, H, H*)

```
1:   Initialize b(u) ← 1; f(u) ← 0 for each vertex u;
2:   level(h) ← 0; Q ← {h} {queue for BFS};
3:   while Q ≠ ∅ {vertices with b(u) = 0 visited first at each level} do
4:       u ← Q.pop( );
5:       if u ∈ H and level(u) ≥ 1 and b(u) = 1 {basic pair} then
6:           extract shortest path SP(h, u) with minimal f(u) and add to H★
7:           b(u) ← 0 {all later extension will become false}
8:       end if
9:       if level(u) = k {no expansion more than levelk for k-degree shortest
             path} then
10:          continue;
11:      end if
12:      if b(u) = 1 and u ∈ H★ then
13:          f(u) ← f(u) + 1 {increase f}
14:      end if
15:      for all v ∈ neighbor(u) {(u, v) ∈ E; expanding u} do
16:          if v is not visited then
17:              add v to queue Q;
18:          else if level(v) = level(u) + 1 then
19:              if b(u) = 0 {update b} then
20:                  b(v) ← 0;
21:              else if b(v) = 1 and f(u) > f(v) {update f} then
22:                  f(v) ← f(u) and parent(v) ← u;
23:              end if
24:          end if
25:      end for
26:  end while
```

Example 4.2

Figure 8:
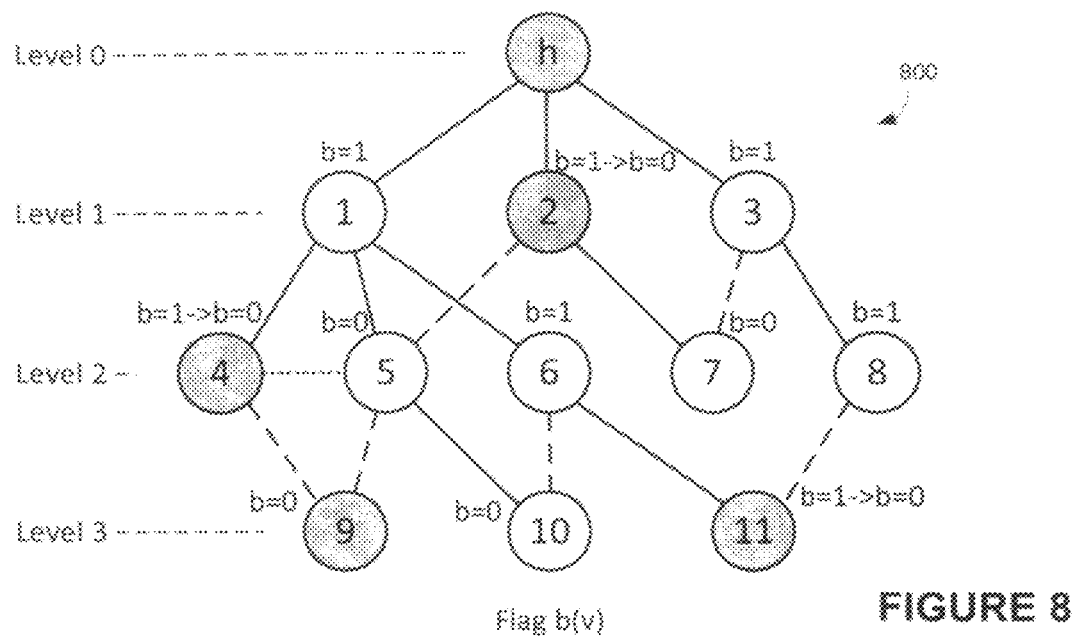
FIG. 8 illustrates an example incremental maintenance of flag bin the BFS process.
Figure 9:
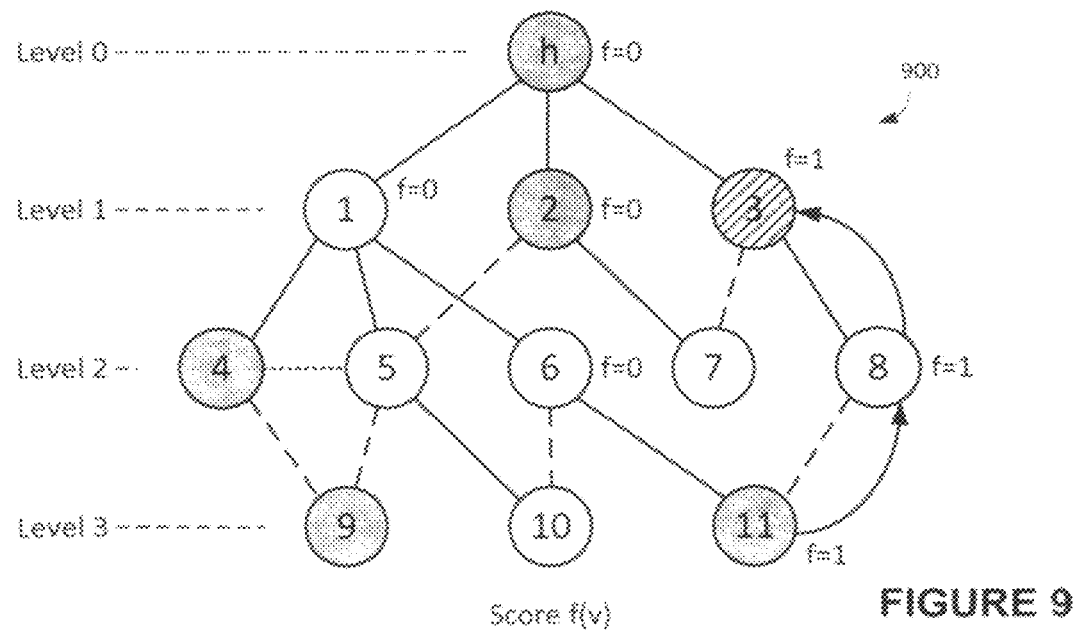
FIG. 9 illustrates an example incremental maintenance of score fin the BFS process.

FIGS. 8 and 9 illustrate the incremental maintenance of flag b and score f in the BFS process. Here the vertices h, 2, 4, 9, and 11 are hubs. In FIGS. 8 and 9 (a), (h, 2), (h, 4), and (h, 11) are basic pairs; the flag b changes from b=1 originally to b=0 (Lines 5-7). After the flag b of 2, 4, and 11 changes to false (b=0), all their descendents in the BFS traversal become false. For instance, the flag b of vertex 5 is false as it is also considered hub 2's descendent. In FIG. 9, the shaded vertex 3 indicates it is already included in the hub-network (3∈H*). Therefore, vertex 11 points to vertex 8 (parent(11)=8 and parent(8)=3) as its f score is higher than that of vertex 6.

Theorem 2.

If Algorithm 1 is invoked for each h∈H, then the induced subgraph G[H*] is a hub-network of H with respect to the k-degree shortest path.

Proof Sketch:

The correctness of the algorithm can be derived from the following two observations: 1) for any basic pair (h, u) with distance no more than k, there is at least one shortest path in G[H] as the algorithm explicitly extracts a shortest path and adds all its vertices to H*; 2) for any composite pair (h, h') with distance no more than k, then it can always be represented as a sequence of basic pairs, which has at least one shortest path in G[H*]. Thus, for any hub pair (h, h') with distance no more than k, their distance (at least one shortest path) is preserved in the induced subgraph G[H*].

The computational complexity for hub-network discovery as described in Algorithm 1 is basically equivalent to that of a simple BFS procedure. The overall procedure takes $O(\Sigma_{h \in H}(|N_k(h)|+|E_k(h)|))$ time, where H is the hub set, and $N_k(h)$ and $E_k(h)$ are the number of vertices and edges, respectively, in u's k-degree neighborhood. Also noted is that this algorithm works correctly for both undirected and directed graphs. Interestingly, noted is the following property of applying Algorithm 1 for an undirected graph.

Lemma 1.

Let (u, v) be a basic hub pair in an undirected graph. Consider Algorithm 1 performs BFS from u first and it discovers the shortest path SP (u, v). When it performs BFS from v and discovers the symmetric basic pair (v, u), the algorithm will not add any additional new vertices.

Proof Sketch:

The score f guarantees f(v)=|SP(v, u)|=|SP(u, v)| and thus a shortest path as "good" as SP (u, v) will be extracted which does not need to add any new vertices to H*.

This observation leads to the simple bound constraint of the hub-network (the final size of H*) and the result of Algorithm 1 will match such a bound.

Lemma 2.

Let $D^b_k \subseteq D_k \subseteq H \times H$ be the set of all unique basic hub pairs whose distance is no more than k, then, $$|H^*| \leq \sum_{(u,v) \in D^b_k} (d(u,v)-1) + |H| \leq \frac{|H|B}{2}(k-1) + |H|,$$

where B is the average number of basic pairs per hub.

Proof Sketch:

The term $$\sum_{(u,v) \in D^b_k} (d(u,v)-1)$$

corresponds to the definition that any basic pair needs to recover only one shortest path; this also corresponds to the worst case scenario in Algorithm 1, where for any basic pair, all non-hub vertices along a new shortest path need to be added to H*. Note that for undirected graph $D^b_k$ treats basic pairs (u, v) and (v, u) as a single one. This directly leads to the term |H|B/2(k−1), which contemplates the maximal distance between any basic hub pair is k and only one shortest path needs to be recovered for symmetric basic pairs (u, v) and (v, u). Algorithm 1 also holds that (Lemma 1). Note the result holds for directed graph as well where B is the total degree of both incoming and outgoing edges.

5. HUB-Network Based Search

In this section, described is the hub-network based bidirectional BFS. The main challenge here is given a hub-network, how can it be leveraged to maximally reduce the expansion of hubs and still guarantee to discover the correct k-degree shortest path? Recall that a key reason for introducing the hub-network is to use it to constraint the expansion of hubs. Thus, a basic search principle is that any hub will only visit its neighbors in the hub-network. But what about any non-hub vertices v in the hub-network, such as v∈H*\H? Should it be expanded only within the hub network or should it be treated as the remaining vertices outside the hub-network? Furthermore, in traditional bidirectional BFS, when two searches (forward and backward) meet for the first time, the shortest path is discovered. Unfortunately, this does not necessarily hold if the hub is not fully expanded and thus the question becomes: what should be the correct stop condition? The stop condition is crucial as it determines the search space and the correctness of discovering the exact shortest path.

In the following, first described is the hub-network based bidirectional BFS algorithm (Subsection 5.1) and then proved is its correctness and discuss its search cost (Subsection 5.2).

5.1 HN-BBFS Algorithm

The Hub-Network based Bidirectional BFS (HN-BBFS) algorithm consists of a two-step process: 1) (Meeting step) A bidirectional search will traverse both hub-network and remaining graphs until the forward and backward searches meet at the first common vertex; 2) (Verification step) Next, the searches continues in the remaining graphs (not hub-network) to verify whether the path discovered in the first step is shortest. If not, this step will discover an alternative shortest path.

Expansion Rule:

In the Meeting step, the forward (backward) BFS follows the following rules to expand vertex v in G: 1) if a vertex is a hub, then it only expands its neighbors in the hub-network; 2) if a vertex is a regular vertex (not in the hub-network), then it expands all its neighbors; 3) for a vertex is a non-hub vertex but in the hub network, H*\H, if the BFS traversal first reaches it through a hub, then it only expands its neighbors in the hub-network; otherwise, it is considered a regular vertex (no shortest path from start (end) vertex to it going through a hub). In the Verification step, both forward and backward BFS traversals will continue but they will not need to expand any hub, and any regular vertex and non-hub vertices in the hub-network will expand all their neighbors in the entire network.

Stop Condition:

The stop condition for the forward (backward) BFS in the Verification step is as follows. Let dist be the shortest path distance discovered so far; let $d^h_s$ ($d^h_t$) be the distance between s(h) to its closest hub h, let $level_f$ ($level_b$) be the current level being traversed by forward (backward) BFS. Then, the forward (backward) BFS will stop when the following condition is met:

$$dist \geq level_f + d^h_s + 1 \; (dist \geq level_b + d^h_t + 1) \tag{1}$$

Overall Algorithm:

Hub-Network based Bidirectional BFS (HNBBFS) is sketched in Algorithm 2. Note that BackwardSearch is essentially the same as ForwardSearch and is omitted for simplicity.

Initially, dist is set to be k+1 for k-degree shortest path search (indicating no path within k-hops) and the met condition is false (Line 2).

The first step (Meeting Step) is carried out by the first while loop (Lines 3-6), where a forward search and a backward search are employed in an alternating manner. In ForwardSearch (and BackwardSearch), a vertex in the corresponding queue Qf (Qb) is expanded. The expansion rule as described earlier is used in Line 15. Basically, if a vertex is a hub or is in the hub-network, H*\H, but the BFS traversal first reaches it through a hub (there is a shortest path from s to u via a hub), it is considered "in-hub-network". Otherwise, it is "out-hub-network". For an in-hub-network vertex, BFS only expands its neighbors in the hub-network. Note that recognizing these "in-hub-network" vertices is straightforward and can be incrementally computed (similar to using the flag b in Algorithm 1).

Algorithm 2 HN-BBFS(G, G[H*], s, t)

```
1:  Q_f ← {s}; Q_b ← {t}; {Queues for forward and backward search}
2:  dist ← k + 1; met ← false;
3:  while (Q_f ≠ ∅ AND Q_b ≠ ∅) AND NOT met AND d(s,Q_f.top)+
       d(Q_b.top, t) < dist do
4:     ForwardSearch(Q_f, false); {not Verification Step}
5:     BackwardSearch(Q_b, false);
6:  end while
7:  stop_f ← false; stop_b ← false;
8:  while (NOT ((Qf = ∅ OR stop_f) AND (Q_b = ∅ OR stop_b))) do
9:     NOT stop_f : ForwardSearch(Q_f, true); {true: Verification Step}
10:    NOT stop_b: BackwardSearch(Q_b, true)
```

-continued

```
11:   end while
12:   return dist and shortest path;
Procedure ForwardSearch(Qf ,Verification)
13:   u ← Q_f.pop( ) {if Verification is true, only out-hub-network vertices
      will
         be visited}
14:   u is set to be visited by forward search;
15:   for all v ← neighbor(u) {if u is a hub or there is a shortest path from
      s to u via a hub, neighbor(u) is within the hub-network} do
16:      if v is visited by backward search {searches meet} then
17:         if d(s, u) + d(v, t) + 1 < dist then
18:            update dist and the shortest path correspondingly;
19:            if NOT met {the first time meet} then
20:               met ← true
21:            end if
22:         end if
23:      end if
24:      if v is not visited AND NOT (Verification and v ∈ H) then
25:         Qf.push back(v);
26:      end if
27:      if Verification AND dist ≥ d(s, v) + d^h_t+ 1 then
28:         stop_f ← true;
29:      end if
30:   end for
```

Once a forward (backward) search visits a vertex already visited by the backward (forward) search, a candidate shortest path is discovered and met is set to be true. Note that when Verification is false (at the first step), every vertex (both hubs and non-hubs) will be visited and expanded.

Once met turns true, the second step (Verification Step) is carried out by the second while loop (Lines 8-11). Before the forward stop condition is met (stop$_f$ is false), the Forward-Search will continue. However, only out-hub-network vertices will be visited and expanded (Line 13 and Lines 24-26). Also, during the expansion process, the candidate shortest path can be updated (Lines 17-19). Finally, when the stop condition is met (Line 26: d(s, v)) is the current BFS level being expanded, thus level$_f$), stop$_f$ will become true and no forward search will not performed (Line 9). Note that $d^h_s$ ($d^h_t$) can be easily computed during the BFS traversal: the first time a hub is visited, its distance to s is recorded as $d^h_s$.

5.2 Correctness and Search Cost

Now discussed the correctness of HN-BBFS (Algorithm 2) and then its search cost (especially in terms of the new Stop condition, Formula 1). To prove the correctness of HN-BBFS, the following important observations are made:

Lemma 3.

For any hub h ∈ H, during the first step (Meeting Step), the distance d(s, h) computed using the forward BFS search, i.e., the number of traversal levels to reach h, is the exact shortest path distance between s and h. The same holds for d(h, t) for the backward BFS traversal.

Proof Sketch:

If s is a hub, then based on the hub-network definition, this clearly holds. If s is not a hub, then one of the following two cases must hold: 1) All shortest paths between (s, h) do not contain a hub except h, so the forward BFS finds the shortest path distance d(s, h) by traversing only non-hub vertices in the original graph; 2) There is a shortest path between (s, h) containing an-other hub, so there is always h', such that (s, h') does not contain any hubs and (h', h) can be discovered in the hub-network.

Lemma 3 demonstrates the power of the hub-network and shows that HN-BBFS can correctly calculate the shortest path (distance) between query vertices to hubs (and between hubs). However, despite this, the candidate shortest path being discovered at the first meeting vertex may not be the exact one. The following lemma categorizes the exact shortest paths if they are shorter than the candidate shortest path discovered in the first step (Meeting Step).

Lemma 4.

Assuming u is the meeting vertex where forward and backward search first meet (Lines 22-26 in Algorithm 2), the candidate shortest path is denoted as SP(s, u, t) and the distance dist is d(s, u)+d(u, t). If there is a shorter path, then it must contain a hub h, such that the exact shortest path can be represented as two segments SP(s, h) and SP(h, t). Moreover, either 1) SP(s, h) contains no hub other than h with distances d(s, h)≥d(s, u) and d(h, t)<d(u, t), or 2) SP(h, t) contains no hub other than h with distances d(s, h)<d(u, t) and d(h, t)≥d(u, t).

Proof Sketch:

This is proved this by way of contradiction. If the lemma does not hold, then the following two types of paths cannot be shorter than the discovered candidate shortest path: 1) there is no hub in the exact shortest path SP (s, t), and 2) there are two hubs $h_s$ and $h_t$, such that the shortest path has three segments: SP (s, $h_s$), SP ($h_s$, $h_t$) and SP ($h_t$, t) where d(s, $h_s$)<d(s, u) and d($h_t$, t)<d(u, t). For the first case, the bidirectional BFS should be able to find such a path (if they are shorter than the candidate SP (s, u, t)) earlier as it only involves visiting non-hub vertices in the graph. For the second case, based on Lemma 3, Algorithm 2 computes the exact d(s, hs) and d($h_t$, t) before the two BFS met at u and the hub-network encodes the correct distance between d($h_s$, $h_t$). Thus, if d(s, $h_s$)+d($h_s$, $h_t$)+d($h_t$, t)<d(s, u)+d(u, t), this shortest path should be discovered (met at an in-hub-network vertex) during the first step (Meeting Step). Since both cases are impossible, the lemma holds.

Theorem 3.

The Hub-Network based Bidirectional BFS approach (HN-BBFS, Algorithm 2) guarantees the discovery of the exact k-degree shortest path.

Proof Sketch:

Basically, it is needed to show that when the stop condition is met, no shorter alternative paths exist. By Lemma 4, if a shortest path exists that is better than the candidate shortest path SP (s, u, t)), it must follow one of two simple formats. These formats suggest only needed is to extend out-hub-network vertices until they meet a hub already visited from the other direction (d(s, $h_s$)<d(s, u) or d($h_t$, t)<d(u, t)). If such a path can be found, it must be shorter than the already discovered distance dist, i.e., dist, i.e., dist>level$_f$+1+$d^h_t$ (the best case situation is when the shortest path extends from the current step by one step to a hub closest to the query vertices). Clearly, if this does not hold, any shortest path in this format will not be smaller than dist.

In classical Bidirectional search, once both directions meet at a common vertex, the search can be stopped and the exact shortest path is discovered. However, in HN-BBFS, in order to reduce the expansion of hubs, some additional traversal (Verification Step) has to be taken. Clearly, if it is needed to walk k/2 additional steps, then the benefit of HN-BBFS can be greatly compromised.

So, what is the average number of steps HN-BBFS needs to take for a typical (random) query in the Verification step? The number is close to zero or at most one. To illustrate, first consider the distance between two vertex pairs to be 6 (since most distances are less than that in social networks), and assume s and t are not hubs (because there are few hubs) but each of them has a direct hub neighbor $d^h_s$=1 ($d^h_t$=1). Note that both directions typically traverse at most three steps, i.e., level$_f$=level$_b$=3. Thus, at most one extra step needs to be taken in this case to make the stop condition true: dist–level$_f$–d$^h_r$–1≥0, where level$_f$=4. Similarly, let us consider the distance to be 4 and assume each direction has taken 2 steps in the Meeting Step. In this case, there is no need to take an additional step (assuming s and t are not hubs), and it can be immediately recognized that the candidate shortest path is indeed the exact one. Finally, it is noted that when dist–level$_f$–d$^h_r$–1=1, i.e., the last step of BFS for Verification, there is no need to expand all the neighbors of a given vertex. Only its immediate hub neighbors need to be expanded and checked (Lemma 4 and Theorem 3). To facilitate this, the neighbors of regular vertices can be reorganized so that the hub-neighbors and non-hub-neighbors are separately recorded.

6. HUB$^2$-Labeling for Shortest Path Computation

In this section, presented is a Hub$^2$-labeling approach which aims to completely avoid visiting (and expanding) any hub. To achieve this, more expensive though often affordable pre-computation and memory cost are utilized for faster online querying processing. In Subsection 6.1, described will be the Hub$^2$-labeling framework and its index construction. In Subsection 6.2, the faster bidirectional BFS will be discussed.

6.1 Hub$^2$-Labeling Framework

Hub$^2$-Labeling replaces the Hub-Network with a Hub$^2$ distance matrix and Hub Labeling.

Hub$^2$: The distance matrix between hub pairs (referred to as Hub$^2$) is precomputed and stored in main memory. Indeed, only the distances of pairs with distance no more than k needs to be computed for k-degree shortest path. As discussed above, nowadays a desktop computer with moderate memory size can easily hold such a matrix for 10K (or more) of hubs.

Hub Labeling:

In order to effectively utilize the distance matrix, each vertex v in the graph also records a small portion of hubs, referred to as the core-hubs, along with the distances. Basically, those core-hubs along with the distance matrix can help quickly estimate the upper-bound of distance between the query vertex pairs and can be used for bounding the search step of bidirectional BFS.

Now, the core-hubs are formally defined.

Definition 3. (Core-Hubs)

Given graph G=(V,E) and a collection H of hubs, for each vertex v, then vertex h∈H is a core-hub for v if there is no other hub h'∈H such that d(v,h)=d(v, h')+d(h', h). Formally, L(v)={h∈$\mathcal{H}$ :∄h'∈$\mathcal{H}$, d(v, $_h$')=d(v, $_h$')+d($_h$', h)}.

Simply speaking, if no other vertex h' appears in any shortest path between v and h, h is v's core-hub. Note that a pair (v,h), where v∈L(v), is similar to a basic pair in the hub-network (Sub-section 4.2). The original basic pair definition only refers to hub pairs, but here it is being extended to vertex pairs with one hub and one non-hub vertex.

Example 6.1

FIG. 6 illustrates the core-hubs (along with the distance) for each non-hub vertices in the original graph (FIG. 4). Here the hubs are 4, 6, 8, 12, 17, 18, and 19. For instance, Vertex 1 only needs to record core-hubs 4, 6, 12 and 19, and it can reach hubs 8 and 17 through them in some shortest path.

Using the core-hubs L and distance-matrix Hub$^2$, the distance and the shortest path for vertex pair (s, t) can be approximated in the following fashion:

$$d_H(s,t) = \min_{x \in L(s)} \wedge_{y \in L(t)} \{d(s,x)+d(x,y)+d(y,t)\} \quad (2)$$

Here, d(x, y) is the exact distance recorded in the distance-matrix Hub$^2$.

The construction of the distance matrix Hub$^2$ and the labeling of core-hubs are also rather straightforward. The BFS procedure in Algorithm 1 can be easily adopted:

1) each BFS performs k steps and thus the distance matrix can be directly constructed;

2) when a vertex v has flag b=1 (basic pair) from BFS traversal of h, h is appended to L(v). Thus, the total computational complexity of the pre-computation is O($\Sigma_{h \in H}$ ($N_k$ (h)+$E_k$ (h))) time, where H is the hub set and $N_k$ (h) and $E_k$ (h) are the number of vertices and edges, respectively, in u's k-degree neighborhood. Noted is that for directed graphs, we will compute both $L_{in}$ (v) and $L_{out}$ (v), one for incoming core-hubs (h, v) and the other for outgoing core-hubs (v, h). To construct such labels, both forward and backward BFS from each hub need to be performed.

The overall memory cost of Hub$^2$-Labeling is the sum of the cost of the distance matrix (Hub$^2$) together with the core-hub labeling for each vertex (L(v)): $\Sigma_{v \in V}$ O(|L(v)|)+O (|H|$^2$). This turns out to be rather affordable. In the experimental study, it is found that for most of the real social networks, the core-hubs of each vertex v is only a small portion of the total hubs (in most case, less than or close to 2%). Thus, the Hub$^2$-Labeling can easily handle graphs with more than 10K hubs. Furthermore, since the second term (the size of the distance matrix) is stable, as the number of vertices increases in the original graph, the first term will scale linearly with respect to |V|.

6.2 Hub-Labeling Query Processing

To compute the k-degree shortest path between vertex pair (s, t), the online query process in Hub$^2$-Labeling consists of two steps:

Step 1 (Distance Estimation):

Using the distance matrix Hub$^2$ and core-hubs labeling L(s) and L(t), the distance $d_H$ (s, t) is estimated (Formula 2).

Step 2 (Hub-Pruning Bidirectional BFS (HP-BBFS)):

A bidirectional BFS from s and t is performed and the search step is constrained by the minimum between k (for k-degree shortest path) and $d_H$ (s, t). In particular, none of the hubs need to be expanded during the bidirectional search. Mathematically, the Hub-Pruning Bidirectional BFS is equivalent to performing a typical Bidirectional BFS on the non-hub induced subgraph, G[V\H] of G.

Theorem 4.

The two-step Hub$^2$-Labeling query process can correctly compute the k-degree shortest path in graph G.

Proof Sketch:

It is observed that any vertex pair with distance no more than k can be categorized as: 1) vertex pairs having at least one shortest path passing through at least one hub in H; and 2) vertex pairs whose shortest paths never pass through any hub.

For any vertex pair (s, t) with distance no greater than k (d(s, t)≤k), if there exists one hub x'∈$\mathcal{H}$ satisfying d(s, t)=d(s, x')+d(x', t), then, x∈$L_H$ (s) and y∈$L_H$ (t) can be found such that d(s, t)=d(s, x)+d(x, y)+d(y,t). In other words, Step 1 (distance estimation), which uses the distance-matrix Hub$^2$ and core-hub labeling, can handle this category. Also, the Step 2 will help confirm the shortest path belongs to this category (cannot find a shorter one).

If an approximate shortest path computed in Step 1 is not an exact one, then the shortest path does not involve any hub. Thus Step 2 can guarantee to extract an exact shortest path using the bidirectional search in the non-hub induced subgraph G[V\H].

The time complexity of online query processing of a pair s and t can be written as $O(|L(s)||L(t)|+N_{k/2}(s|G[V\backslash H])+E_{k/2}(s|G[V\backslash H])+N_{k/2}(t|G[V\backslash H])+E_{k/2}(t|G[V\backslash H]))$, where $|L(s)||L(t)|$ is the distance estimation cost and the remaining terms are the cost of bidirectional search. $N_{k/2}$ ($N'_{k/2}$) and $E_{k/2}$ and ($E'_{k/2}$) are the number of vertices and edges in the k/2-neighborhood (reversed neighborhood which follows the incoming edges) of the non-hub induced subgraph G[V\H]. Since the hubs are excluded, the cost of hub-pruning bidirectional BFS is significantly smaller than that on the original graph.

However, if the number of core-labels is large, then the distance estimation can be expensive (a pairwise join on L(s) and L(t) is performed). To address this issue, the core-hubs in L(u) can be organized in a level-wise fashion, each level corresponding to their distance to u, such as $L^1$ (u), $L^2$ (u), ... $L^k$ (u). Using such a level-wise organization, a much more efficient distance estimation can be performed: the pairwise joins first performed between $L^1$ (s) and $L^1$ (t); then on ($L^1$ (s), $L^2$ (t)), ($L^2$ (s), $L^1$ (t)), ($L^2$ (s), $L^2$ (t)), etc. Given this, let us denote d to be the shortest path length obtained by pairwise join so far. Assuming that ($L^p$ (s), $L^q$ (t)), if d<p+q, is currently being used then terminating the pairwise join can be accomplished immediately. This is because it is impossible for ($L^{p'}$ (s), $L^{q'}$ (t)) to produce better results since $p'+q' \geq p+q > d$. This early termination strategy based on the level-wise organization can help us effectively prune unnecessary pairwise join operations and improve the query efficiency.

CONCLUSION

In this disclosure, introduced are techniques centered on hubs for k-degree shortest path computation in large social networks. The Hub-Network and $Hub^2$-Labeling algorithms can help significantly reduce the search space. The extensive experimental study demonstrates that these approaches can handle very large networks with millions of vertices, and its query processing is much faster than online searching algorithms and Sketch-based approaches, the state-of-the-art shortest path approximation algorithms. This may be the first practical study on computing exact shortest paths on large social networks. Future study may include how to parallelize the index construction and query answering process. Also planned is to investigate how to compute k-degree shortest path on dynamic networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for determining shortest distances between nodes in graphs, wherein the method is accomplished at least in part using a processor, the method comprising:

identifying an original graph comprising a plurality of nodes and a plurality of edges;

identifying a plurality of hub nodes from within the original graph;

creating a hub matrix comprising the plurality of hub nodes and a shortest path between the plurality of hub nodes;

determining a shortest distance between the at least two nodes using the original graph;

estimating a distance between the at least two nodes in the original graph using at least a bidirectional breadth first search and a distance between at least two hub nodes in the hub matrix;

preventing the expansion of the plurality of hub nodes of the hub matrix when the estimating step is performed; and discontinuing the determining of the shortest distance between the at least two nodes using the original graph if the shortest distance exceeds the estimated distance and, if the shortest distance exceeds the estimated distance, using the estimated distance as the shortest distance.

2. The method of claim 1, wherein determining the shortest distance between the at least two nodes using the original graph comprises using a bidirectional breadth first search of the at least two nodes.

3. The method of claim 2, wherein determining the shortest distance between the at least two nodes using the original graph, comprises using a function of nodes which can reach the at least two nodes.

4. The method of claim 1, wherein the creating a hub matrix comprises precomputing the hub matrix before determining the shortest distance is undertaken to reduce time needed for determination of shortest distance.

5. One or more non-transitory computer readable storage media having program instructions stored thereon for determining a least number of intermediate nodes between at least two nodes on a graph that, when executed by a computing system, direct the computing system to at least:

identify an original graph comprising a plurality of nodes and a plurality of edges;

identify a plurality of hub nodes from within the original graph;

create a hub matrix comprising the plurality of hub nodes and a shortest path between the plurality of hub nodes;

estimate a distance between at least two nodes in the original graph using at least a bidirectional breadth first search and a distance between at least two hub nodes in the hub matrix;

determine a shortest distance between the at least two nodes using the original graph, without using the hub nodes;

discontinue the determining of the shortest distance between the at least two nodes using the original graph if the shortest distance exceeds the estimated distance and, if the shortest distance exceeds the estimated distance, use the estimated distance as the shortest distance, wherein the expansion of the plurality of hub nodes of the hub matrix is prevented when estimating the distance between the at least two nodes of the original graph.

6. The one or more non-transitory computer readable storage media of claim 5, wherein identifying the plurality of hub nodes comprises identifying nodes with a relatively large number of connections to other nodes.

7. The one or more non-transitory computer readable storage media of claim 5, wherein determining the shortest distance between the at least two nodes using the original graph comprises using a bidirectional breadth first search of the at least two nodes.

8. The one or more non-transitory computer readable storage media of claim 5, wherein determining the shortest distance between the at least two nodes using the original graph comprises using a function of nodes which can reach the at least two nodes.

9. A method of determining shortest distances between nodes in graphs, wherein the method is accomplished at least in part using a processor, the method comprising:

identifying an original graph comprising a plurality of nodes and a plurality of edges;

identifying a plurality of hub nodes from within the original graph;

creating a hub matrix comprising the plurality of hub nodes and a shortest distance between the plurality of hub nodes;

estimating a distance between at least two nodes in the original graph using at least a bidirectional breadth first search and a distance between at least two hub nodes in the hub matrix;

preventing the expansion of the plurality of hub nodes of the hub matrix when the estimating step is performed;

determining a shortest distance between the at least two nodes using the original graph, without using the hub nodes; and discontinuing the determining of the shortest distance between the at least two nodes using the original graph if the shortest distance exceeds the estimated distance and, if the shortest distance exceeds the estimated distance, using the estimated distance as the shortest distance.

10. The method of claim 9, wherein determining the shortest distance between the at least two nodes using the original graph comprises using a bidirectional breadth first search of the at least two nodes.

* * * * *